United States Patent [19]

Jenneman et al.

[11] Patent Number: 5,363,913
[45] Date of Patent: Nov. 15, 1994

[54] INJECTION OF SEQUESTERING AGENTS FOR SUBTERRANEAN MICROBIAL PROCESSES

[75] Inventors: Gary E. Jenneman; James B. Clark, both of Bartlesville, Okla.

[73] Assignee: Phillips Petroleum Company, Bartlesville, Okla.

[21] Appl. No.: 114,040

[22] Filed: Aug. 30, 1993

[51] Int. Cl.$^5$ ............................................. E21B 43/22
[52] U.S. Cl. ................................. 166/246; 166/274; 166/305.1; 435/281
[58] Field of Search ............... 166/246, 274, 275, 294, 166/305.1; 435/281; 405/128

[56] References Cited

U.S. PATENT DOCUMENTS

| | | | |
|---|---|---|---|
| 3,032,472 | 5/1962 | Hitzman | 166/246 |
| 3,118,500 | 1/1964 | Maddox, Jr. et al. | 166/246 |
| 4,401,569 | 8/1983 | Jhaveri et al. | 435/281 X |
| 4,450,908 | 5/1984 | Hitzman | 166/246 |
| 4,460,043 | 7/1984 | Thompson et al. | 166/246 |
| 4,475,590 | 10/1984 | Brown | 166/246 |
| 4,522,261 | 6/1985 | McInerney et al. | 166/246 |
| 4,534,412 | 8/1985 | Dovan et al. | 166/295 |
| 4,552,217 | 11/1985 | Wu et al. | 166/270 |
| 4,558,739 | 12/1985 | McInerney et al. | 166/246 |
| 4,610,302 | 9/1986 | Clark | 166/246 |
| 4,732,680 | 3/1988 | Weaver et al. | 210/610 |
| 4,799,545 | 1/1989 | Silver et al. | 166/246 |
| 4,800,959 | 1/1989 | Costerton et al. | 166/246 |
| 4,905,761 | 3/1990 | Bryant | 166/246 |
| 4,906,575 | 3/1990 | Silver et al. | 435/253.6 |
| 4,941,533 | 7/1990 | Buller et al. | 166/252 |
| 4,947,932 | 8/1990 | Silver et al. | 166/246 |
| 4,971,151 | 11/1990 | Sheehy | 166/246 |
| 4,979,564 | 12/1990 | Kalpakci et al. | 166/273 |
| 4,991,652 | 2/1991 | Hoskin et al. | 166/270 |
| 5,083,610 | 1/1992 | Sheehy | 435/281 X |
| 5,083,611 | 1/1992 | Clark et al. | 166/246 |
| 5,143,155 | 9/1992 | Ferris et al. | 166/274 X |

*Primary Examiner*—George A. Suchfield
*Attorney, Agent, or Firm*—Cynthia L. Stokes

[57] ABSTRACT

A novel process for sustaining microbial activity in subterranean formations which comprises introducing in addition to microbial nutrients, a sequestering anion. This process may include the sequential injection of sources of individual nutrient components which are deficient in said subterranean formation, whereby the injected phosphorus source is more readily transportable due to the presence of a sequestering agent in the formation.

10 Claims, No Drawings

INJECTION OF SEQUESTERING AGENTS FOR SUBTERRANEAN MICROBIAL PROCESSES

This invention relates to the use of sequestering agents in addition to nutrients in a method for promoting microbial activity in subterranean formations at depth from the wellbore.

BACKGROUND

In many subterranean microbial processes, nutrient selection and injection are controlling factors to successful operations. The microorganisms utilized must be nutritiously sustained and metabolically active and thus able to achieve their specific objective.

Numerous microorganisms suitable for achieving various microbial objectives in subterranean formations are known in the art. In order to achieve a specific microbial objective, suitable microorganisms can be selected and injected into the subterranean formation. Oftentimes, however, endogenous microorganisms well suited for achieving a particular microbial objective are already present within the formation.

Recently, a method was disclosed by Clark, et al. (U.S. Pat. No. 5,083,611 assigned to Phillips Petroleum Company), which overcame many problems associated with microbial nutrient injection methods then known to the art. This newly disclosed method provides for the sequential injection into a subterranean formation of sources of individual nutrient components which are deficient in the subterranean formation so that a complete nutrient medium capable of sustaining substantial microbial activity is formed in the subterranean formation upon injection of the last nutrient source. Each of the nutrient sources is comprised of at least one of the deficient individual nutrient components. Further, each of the nutrient sources, up to and including the next to the last nutrient source injected, is injected in an amount such that at least one individual nutrient component contained therein is retained in the subterranean formation in an amount sufficient for achieving the desired in-situ microbial objective.

The above method prevents the excessive utilization and depletion of nutrient components by microorganisms located in the vicinity of the borehole and also takes advantage of chromatographic retention in order to achieve nutrient media distribution beyond the proximity of the borehole. However, it has been discovered and disclosed by the present application, that in order to achieve biomass production (i.e. microbial growth and/or exopolymer production) to plug high permeability zones within subterranean formations, a sequestering agent when used in the method of U.S. Pat. No. 5,083,611 and in addition to injected nutrients, exhibits greater plugging potential that in the absence of sequestering agents. The ability of the nutrients to be transported in-depth is therefore of great importance. Some problems associated with the use of known inorganic phosphorus sources is their tendency to complex with multivalent cations within the reservoir which results in poor solubility and heightened difficulty in transport distal to the wellbore. Sequestering agents when injected into subterranean formations bind with the multivalent cations there present, thus allowing free transport of the phosphorus nutrient source.

The present invention provides a method whereby injected sequestering agents increase solubility of the phosphate source thereby improving transportability in porous rock and in addition provide a more soluble source of phosphate to the microorganisms which can then be more readily utilized than the insoluble form.

It is therefore an object of this invention to provide a method of increasing the solubility and transportability of an inorganic phosphorus source for use in the state-of-the art nutrient injection for subterranean microbial processes.

These and other objects of the present invention will become apparent upon inspection of the disclosure and the claims herein provided.

SUMMARY OF THE INVENTION

In accordance with the present invention, we have discovered that when a sequestering agent is injected in addition to an inorganic phosphorus source in subterranean microbial processes, the phosphorus is made more soluble and more readily transportable, thus allowing desired biological activity to occur.

A process is therefore provided for sustaining microbial activity in subterranean formations which comprises introducing in addition to a phosphorus nutrient source, a sequestering agent.

DETAILED DESCRIPTION

The sequestering agent plus nutrient injection system disclosed herein can generally be used in conjunction with any process wherein microbial activity is induced in a subterranean formation. Examples of such processes include microbial enhanced oil recovery, (MEOR) processes used in oil-bearing subterranean formations, and bioremediation processes used in aquifers. Typical microbial enhanced oil recovery processes include those wherein microorganisms are used to alter subterranean formation permeability and those wherein microorganisms are used for in-situ generation of chemicals useful for enhanced oil recovery. Examples of in-situ generated chemicals include water-soluble polymers, surfactants, solvents such as ethanol and acetone. acids, carbon dioxide, etc.

The present inventive injection of sequestering agents in combination with nutrients is particularly well suited for use in conjunction with MEOR processes for improving the volumetric sweep efficiency of subterranean formations. Oil-bearing subterranean formations contain porous rock with heterogenous zones of permeability. Water, used to mobilize oil in a waterflood, preferentially invades the higher permeability zones due to these zones' decreased resistance to flow. This causes large reserves of oil, contained in the lower permeability regions, to be bypassed. In microbial enhanced oil recovery processes, nutrients are fed to microorganisms located in the higher permeability formation zones. The nutrients stimulate the microorganisms and allow the microorganisms to generate an increased biomass. This increased biomass results from cell growth and/or the biological production of polymer(s). Once the higher permeability formation zones have been plugged, water is diverted to the previously uninvaded lower permeability zones and thereby displaces oil contained in the lower permeability zones.

The microorganisms used in conjunction with the present invention may be selected for the attainment of a desired microbial objective and then injected into the subterranean formation. Preferably, such microorganisms when used, are injected into the formation prior to nutrient injection. As is known in the art, the particular microorganisms chosen for injection should be tolerant of the conditions, e.g., temperature, pH, salinity etc., existing in the formation. Microorganisms can be injected into subterranean formations using methods which are well known in the art. The preferred microorganism injection method will depend upon the microorganism(s) chosen, and the specific characteristics of the formation.

Oftentimes, endogenous microorganisms capable of achieving a desired microbial objective are already present within the subterranean formation. In order to cause the microorganisms within a subterranean formation, whether endogenous or injected, to produce a desired in-situ result, deficient nutrient components are injected into the formation which facilitates the regulation of where, in the formation, a complete nutrient package is formed and hence, microbial activity occurs. Deficient nutrient components are those individual nutrient components which are needed by the microorganisms for achievement of a desired microbial objective and which are not already present within the formation in amounts sufficient for achieving the microbial objective. Subterranean formations are typically deficient in utilizable phosphorus, nitrogen, or carbon nutrients, or combinations thereof. Suitable phosphorus sources and nitrogen sources (e.g., ammonium-containing compounds such as ammonium chloride, nitrates such as potassium nitrate, and organic nitrogen sources such as amino acids and peptides), as well as carbon sources (e.g., fats, proteins, simple carbohydrates and complex carbohydrates), and other nutrient sources which are suitable for use in nutrient injection methods are well known in the art. Selection of a phosphorus source which is sufficiently deficient in carbon and nitrogen and which causes increased in-situ biomass production at depths of penetration where plugging is most desirable is necessary in the practice of the above method. The inventive use of sequestering agents in addition to the phosphorus source results in an increase in microbial activity at desired plugging sites due to the ability of the sequestering agents to enhance phosphate availability by increasing the solubility and the transportability of phosphorus.

The term sequestering agents as used herein refers to anions typically of citrate, acetate, nitrilotriacetate, tartrate, gluconate and mixtures thereof. Presently preferred is citrate. The sequestering anion is usually supplied or available as the sodium salt, or in some cases as the free acid, e.g. citric acid having the chemical composition $C_6O_7H_8$.

The particular sequestering agent to be used in a given situation would be based on the chemical, biological and physical properties of the particular reservoir of relevancy. The amount of sequestering agent to be employed would be determined by the concentration of multivalent cations present in a particular reservoir since the function of the sequestering agent is to bind up the multivalent cations and thereby reduce the formation of precipitates that would otherwise result from the interaction of these cations with compounds of the nutrient medium such as inorganic phosphorus sources. The amount therefore of sequestering agent to be added will be in ratio proportion to the amount of multivalent cations present in the formation and will be an amount in the range of about 1:3 to about 1:200 molar ratio of sequestering agent to multivalent cations. With a preferred range being about 1:30 to about 1:50 and a most preferred amount of about 1:40 molar ratio of sequestering agent to multivalent cations present in the formation.

In accordance with the present invention the sequestering agent can be added either prior to, simultaneously, or following the inorganic phosphorus nutrient utilized. Presently preferred, however, is that the sequestering agent be added simultaneously with the phosphorus source. The sequestering agent makes the phosphorus nutrient more readily available to feeding microorganisms by increasing the nutrients' solubility. This is true because when multivalent cations complex with the sequestering agent, they are no longer available to complex with the phorphorus to form a precipitate, thus allowing the phosphorus to remain soluble and more easily transportable. The present invention is especially advantageous when employed in hard brine i.e., brine with high concentration of multivalent cations—brine containing large amounts of calcium, magnesium, barium and/or strontium which would otherwise complex with the phosphorus and cause the phosphorus to precipitate.

Secondly, sequestering agents have been discovered by present inventors to reduce adsorption and increase desorption of phosphorus nutrient sources, one in particular is inorganic phosphate. This reduction in phosphate adsorption and increase in phosphate desorption contributed to substantial savings in chemical cost as well as injection time. More importantly, the phosphate is able to be transported, in depth, away from the well bore.

The preferable phosphorus nutrient source used in accordance with the present invention is a solution of an inorganic phosphate or polyphosphate. Any inorganic phosphate or polyphosphate can be used in practicing the present invention as the solubility and hence transportability of the inorganic phosphate will increase when it is used in combination with a sequestering agent and it will therefore be less retainable by rock matrix of the reservoir. One preferred example of an inorganic phosphate is an orthophosphate.

Thus, in accordance with the present invention, a sequestering agent is introduced into a subterranean formation and is capable of complexing with multivalent cations present in said formation; the sequestering agent is added in addition to microbial nutrients in processes of injecting either sequentially or co-injecting microbial nutrients into a subterranean formation sources of nutrient components which are deficient in said subterranean formation. The process for sustaining microbial activity in subterranean formations may comprise the steps of sequentially injecting a substantially carbon-nutrient-free first nutrient solution comprising a phosphorus nutrient source into said subterranean formation; and thereafter, injecting a substantially phosphorus-nutrient-free second nutrient solution comprising a carbon nutrient source into said subterranean formation.

The inventive process is particularly suited for enhancing oil recovery where the subterranean formation is an oil bearing subterranean formation.

The following examples have been provided merely to illustrate the practice of the invention and should not be read as to limit the scope of the invention or the appended claims in any way.

EXAMPLES

The following examples relate to the transport of inorganic phosphate, a microbial nutrient source, through rock cores. These experiments were conducted both with and without the addition of a sequestering agent for purposes of comparison. The first example relates to the effect of citrate on increasing the solubility of phosphate in the presence of high concentration of multivalent ions. An increase in solubility of the phosphate suggests a lower adsorption rate and hence increased transport through the rock. The latter two examples were performed by applying breakthrough curve analyses to rock, core plugs by the methods described below. These examples demonstrate the effectiveness of a sequestering agent, more specifically, citrate, in increasing the desorption rate and decreasing the adsorption rate of phosphate.

Core Preparation

Two 2.54 cm diameter core plugs were drilled from a 4-inch diameter core obtained from the North Burbank Unit (NBU), Osage County, Okla. (Table 1). Core plugs were drilled with a hollow core bit along the bedding plane. Cores were cleaned in a Soxhlet extractor using alternating toluene and methanol washes until all oil was removed. Tapped Ryton end-plates were epoxied to the ends after they had been squared off with a diamond blade saw. A small space, 0.005 inches, was left between the ends of the core and the end plates to allow radial flow across the face of the core. Cores were then epoxied along the sides and allowed to dry. Cores were then saturated under vacuum with filtered T-5 brine (Table 2). The brine was filtered via a 0.22 micron cellulose acetate membrane filter into a sterile container housed inside an anaerobic glove box (Forma Scientific Anaerobic System, Model 1024). Cores were flooded to irreducible water saturation with clean NBU crude oil and then flooded to residual oil saturation with filtered T-5 brine. Oil was cleaned by filtration and centrifugation. Brine and oil were kept inside an anaerobic glove box to prevent oxidation. Fluids were pumped via a peristaltic pump through ⅛ inch internal diameter (ID) stainless steel tubing into the epoxied core located outside the glove box. Pumping velocity was approximately 20 ft/d. Fluids were pumped into the cores, housed outside the glove box, via tubing that was run through ⅛-inch pass-through fittings (Swagelok) fastened to the side of the anaerobic glove box. Cores were mounted vertically and the brine and oil pumped from the top (inlet) of the cores to the bottom (outlet). Cores were placed in a convection oven and run under atmospheric conditions at the approximate temperature of the reservoir (45° C.). A fraction collector was used to collect effluent samples.

TABLE 1

| Parameter | Core Properties | |
|---|---|---|
| | Core No. 1 | Core No. 2 |
| Location | NBU | NBU |
| Length | 1.303 | 1.460 |
| Diameter (cm) | 2.54 | 2.54 |
| Porosity | .25 | .25 |
| Permeability (mD) | 512 | 399 |
| Pore Volume (mL) | 1.65 | 1.85 |

Tract—5Brine

All tests were performed with field brine collected form a skimmer tank at the Tract 5 (T-5) tank battery located at the North Burbank Unit, Osage County, Okla. Burbank brine is typical of many highly mineralized, oil-reservoir brines in that a large percentage of the solids are sodium and calcium salts (Table 2). Brine samples were collected in glass bottles pre-incubated in an anaerobic glove box to remove oxygen. Bottles were capped with a butyl rubber septum. The septum was penetrated with a 22-gauge hypodermic needle attached to a ¼-inch (ID) nylon tubing that was used to transmit the brine sample into the bottle. Bottles of brine were transported back to the lab the same day and placed in an anaerobic glove box.

TABLE 2

| Chemical Analysis of Injection Brine from the Tract 5 Tank Battery at the North Burbank Unit | |
|---|---|
| Analyte | Concentration g/L |
| ammonium | .033 |
| nitrate | <.005 |
| nitrate | <.005 |
| sulfate | .020 |
| phosphate | <.050 |
| total organic carbon | .025 |
| calcium | 6.290 |
| barium | .755 |
| magnesium | 1.250 |
| sodium | 31.000 |
| chloride | 63.00 |
| iron | .0168 |
| total dissolved solids | 127.300 |

Phosphate Determination

Radioisotope method: $^{32}$P-sodium monohydrogen phosphate, a radioactive isotope, was used to monitor relative concentrations of phosphate in the following examples. The $_{32}$P-sodium monohydrogen phosphate (radionuclide purity=99 percent) was purchased from DuPont (Wilmington, Del.) and had a specific activity of 1.0 Ci/mmol.

In Examples II and III below 200 uCi of $^{32}$P-sodium monohydrogen phosphate (DuPont) was added to filtered Tract 5 brine and brought to a final phosphate concentration of 150 mM with non-radioactive disodium monohydrogen phosphate. This solution was placed inside an anaerobic glove box where it was then pumped outside the glove box through ⅛-inch stainless steel tubing and into a core housed inside an oven, as described previously. The solution was pumped at a velocity of 12.3 ft/d and fraction collection did not begin until the phosphate solution was pumped to the face of the core. Therefore, a core pore volume (PV) and the dead volume in the effluent line was collected before the first potential PV containing phosphate arrived in the fraction collector. Effluent samples were pipetted into scintillation cocktail and counted using a Beckman liquid scintillation counter.

EXAMPLE I

Sterile, conical, polypropylene, centrifuge tubes (50 ml capacity) were placed inside an anaerobic glove box (Forma Scientific, model 1024) containing an atmosphere of 10 percent hydrogen, five percent carbon dioxide and 85 percent nitrogen. The tubes were incubated inside this glove box for 24 hours to remove any traces of oxygen. Oxygen was removed in order to prevent the oxidation of the brine. Brine oxidation would have resulted in oxidation of the ferrous iron to ferric iron resulting in possible precipitation of ferric phosphate.

Four samples were prepared by adding trisodium citrate to filtered Tract 5 brine to achieve the following four concentrations of citrate: 0, 1, 5, and 20 mM. Twenty-five ml of each citrate concentration were pipetted into four different centrifuge tubes. Na$_2$HPO$_4$ was added to each tube at a final concentration of 1.0 mM. Five microcuries of $^{32}$P-labeled Na$_2$HPO$_4$ were then added to each tube. The tubes were incubated inside the glove box at 25° C. A 1.5 ml sample was removed from each tube at 3, 9, 15, 23, 30, 38 and 50 days following isotope addition. One sample was taken with a syringe and filtered through a 0.22 micron membrane filter (soluble phosphate) while another 1.5 ml sample was taken after resuspending any particulate matter (soluble+insoluble phosphate). Exactly 0.5 ml of the filtrate and the suspended sample were dispensed, in duplicate, into separate plastic vials containing 2.0 ml of scintillation cocktail (Aquassure, DuPont). These vials were then placed in a Beckman liquid scintillation counter and the counts per minute (cpm) recorded. All counts were corrected for background and coincidence counting errors. The percentage soluble phosphate was calculated by dividing the average counts in the filtrate by the counts in the suspended sample.

After 50 days, the amount of soluble phosphate in the tubes containing citrate was 2.0 to 2.5 times that in the tube containing no citrate. This demonstrates that citrate increases the solubility of phosphate in the presence of a brine containing high concentrations of multivalent cations. This increased solubility of phosphate in the presence of citrate suggests that sequestering agents such as citrate can decrease the adsorption of phosphate in the presence of multivalent ions as demonstrated in Examples II and III.

EXAMPLE II

Filtered Tract 5 brine containing the radioactive phosphate solution, as described in the above radioisotope method, was injected into Core 1 at a velocity of approximately 12 ft/d. The results demonstrated that the phosphate was highly retained by the rock. Equilibrium between the adsorbing and non-adsorbing phosphate was not attained within the first 255 PV injected. At this point, it was estimated that nearly 77 percent of the total phosphate injected had been retained by the rock.

Filtered Tract 5 brine was then pumped through the core to measure the desorption of the retained phosphate. The greater the rate of desorption the better will be transport of the phosphate in the rock. After 160 PV of filtered brine were injected, the effluent concentration of phosphate, had decreased from 2.85 mg/L to 1.43 mg/l. Over this period of desorption approximately 14 percent of the total phosphate retained was recovered in the effluent.

Next, 25 additional PV of filtered brine were injected during which time the effluent concentration of phosphate had declined below 1.43 mg/L. This was followed by 160 PV of filtered brine containing 5.0 mM citrate, as trisodium citrate. Upon addition of the first 20 to 30 PV of citrate solution the effluent phosphate concentration increased by more than 2 times. This demonstrates that sequestering agents such as citrate can effectively increase the desorption rate and hence transport of phosphate in the rock.

EXAMPLE IIi

In order to determine the effect of citrate on the adsorption rate, the radioactive phosphorus solution (described above) amended with 5.0 mM trisodium citrate was injected through another core, Core 2, at a rate of 12.3 ft/d. This core had approximately the same PV as the previous core therefore the amounts of phosphate injected per PV of injectant are close to the same as in Example II. After 80 PV of phosphate-citrate solution had been pumped through the core the concentration of phosphate in the effluent was 50 to 60 percent of that injected. This compares to an effluent phosphate concentration of approximately 20 percent of that injected for the core in which no citrate was added after 80 PV of fluid were injected. This suggests that citrate has a very significant effect on decreasing the adsorption rate of phosphate in a rock core thereby allowing enhanced phosphate transport in the rock.

That which is claimed is:

1. In a process for sustaining microbial activity in subterranean formations comprising the steps of injecting a substantially carbon-nutrient-free first nutrient solution comprising a phosphorus nutrient source into said subterranean formation; and thereafter, injecting a substantially phosphorus-nutrient-free second nutrient solution comprising a carbon nutrient source into said subterranean formation, the improvement which comprises additionally introducing into said formation, at leas t one sequestering agent capable of complexing with multivalent cations present in said formation.

2. A process of claim 1 wherein said sequestering agent is introduced simultaneously with an inorganic phosphorus nutrient source.

3. A process of claim 1 wherein said sequestering agent is selected from the group consisting of citrate, acetate, nitrilotriacetate, tartrate, gluconate, and mixtures thereof.

4. A process in accordance with claim 3 wherein said sequestering agent comprises titrate.

5. A .process in accordance with claim 4 wherein said citrate is introduced in the form of citric acid.

6. A process in accordance with claim 1 wherein said sequestering agent is added in an amount in the range of about 1:3 to 1:200 molar ratio of sequestering agent to multivalent cations present in said formation.

7. A process in accordance with claim 1 wherein said sequestering agent is added in an amount in the range of about 1:30 to about 1:50 molar ratio of sequestering agent to multivalent cations present in said formation.

8. A process in accordance with claim 1 wherein said sequestering agent is added in an amount of about 1:40 molar ratio of sequestering agent to multivalent cations present in said formation.

9. The process of claim 1 wherein said subterranean formation is an oil-bearing subterranean formation and said process is used to enhance oil recovery.

10. The process of claim 1 wherein said process is used in bioremediation.

* * * * *

UNITED STATES PATENT AND TRADEMARK OFFICE
CERTIFICATE OF CORRECTION

PATENT NO.   : 5,363,913

DATED        : November 15, 1994

INVENTOR(S)  : Gary E. Jenneman and James B. Clark

It is certified that error appears in the above-identified patent and that said Letters Patent is hereby corrected as shown below:

Column 8, claim 1, line 30, the word "leas" should read ---least---.

Column 8, claim 1, line 30, the letter "t" should be deleted.

Column 8, claim 5, line 41 the "." between "A" and "process" should be deleted.

Signed and Sealed this

Twenty-second Day of August, 1995

Attest:

BRUCE LEHMAN

*Attesting Officer*        *Commissioner of Patents and Trademarks*